United States Patent [19]

Yamanaka

[11] 4,069,501
[45] Jan. 17, 1978

[54] SOLID-STATE VIDEO CAMERA

[75] Inventor: Seisuke Yamanaka, Mitaka, Japan

[73] Assignee: Sony Corporation, Tokyo, Japan

[21] Appl. No.: 685,362

[22] Filed: May 11, 1976

[30] Foreign Application Priority Data

May 13, 1975   Japan .................................. 50-56912

[51] Int. Cl.$^2$ .............................................. H04N 9/04
[52] U.S. Cl. ...................................................... 358/44
[58] Field of Search ............................. 358/41, 43, 44

Primary Examiner—Robert L. Richardson
Attorney, Agent, or Firm—Hill, Gross, Simpson, Van Santen, Steadman, Chiara & Simpson

[57] ABSTRACT

A solid state video camera having a plurality of charge coupled devices having an alignment pitch with one another selected at $\tau_H$ where $\tau_H$ is the reciprocal of the sampling frequency. A light image is projected on the three charge coupled devices, respectively. Assuming that the relative positional relationship among the light images projected on the respective charge coupled devices is, as between the first and second charge coupled devices, taken as $\tau_{12}$ and, as between the first and third charge coupled devices, taken as $\tau_{13}$, respectively, then the relative displaced distances $\tau_{12}$ and $\tau_{13}$ are selected to satisfy the following equations $$\tau^{12} = \frac{\tau H}{2\tau} \cos^{-1}\left(\frac{L_3^2 - L_1^2 - L_2^2}{2L_1 L_2}\right)$$

$$\tau_{13} = \frac{\tau H}{2} + \frac{\tau H}{2\tau} \cos^{-1}\left(\frac{L_3^2 + L_1^2 - L_2^2}{2L_1 L_3}\right)$$

where $L_1$, $L_2$ and $L_3$ represent the levels of signals which will form the luminance signal relating to the respective charge coupled devices.

5 Claims, 13 Drawing Figures

SOLID-STATE VIDEO CAMERA

BACKGROUND OF THE INVENTION

1. Field of the Invention

The field of art to which this invention relates is solid state cameras and in particular to solid state cameras using a plurality of semiconductor image sensor chips.

2. Description of the Prior Art

In the case of using a solid state sensor, such as a charge coupled device (hereinafter referred to as CCD), as an image pickup device for a television camera, input photo or optical information corresponding to an image is converted into electrical signals in response to a sampling at every picture element. In contrast to well known vidicons, output signals are sampled in a CCD at every picture element. If is it assumed that the sampling frequency is $f_c$, then the alignment pitch $\tau_H$ of picture elements in the horizontal direction is $1/f_c$. The electric charges stored in the respective picture elements are finally transferred to an output terminal at a rate determined by a clock pulse frequency, and the video information is derived in serial form. The resultant video signal contains DC components and side band components of the sampling frequency $f_c$ modulated with the DC components.

The side band component is distributed, upper and lower, with respect to the sampling frequency $f_c$, which is at its center. If the frequency band of the DC component is selected sufficiently wide so as to increase the resolution, a higher band component of the DC component is superimposed with the side band component and hence a certain part thereof is caused to develop a sampling error. If a picture is reproduced from such a video signal, a flicker is caused in the resulting picture.

Since this flicker is caused by the sampling error, the sampling error and consequently the flicker can be avoided by restricting the frequency band of the DC component to be smaller than one-half the sampling frequency $f_c$. However, if the frequency band of the DC component is restricted as above, the resolution is deteriorated. In order to make the frequency band of the DC component about 3.5 MHz without deteriorating the resolution, the sampling frequency $f_c$ may be increased. The sampling frequency $f_c$ is obtained by the product of $n f_H$ ($f_c = n f_H$) where $n$ is the number of picture elements in the horizontal direction of the CCD and $f_H$ is the horizontal frequency of the television signal (practically, an effective scanning time period in the horizontal direction). If the sampling frequency $f_c$ is made so high as to remove the sampling error, the number $n$ of the picture elements must be increased correspondingly which then results in difficulty and expense in the manufacturing of the CCD.

SUMMARY OF THE INVENTION

It is an object of the present invention to provide a solid state camera using a charge coupled device which will satisfy the abovementioned conditions and thereby avoids sampling error.

It is another object of the present invention to provide a solid state camera as described above wherein means are provided for mixing the respective signal outputs and for deriving an output video signal from the mixing means.

In accordance with an aspect of the invention there is provided a solid state video camera having three charge coupled devices having an alignment pitch of picture elements selected at $\tau_H$ where $\tau_H$ is the reciprocal of the sampling frequency. With this solid state video camera, a light image is projected to the three charge coupled devices, respectively. Assuming that the relative positional relationship among the light images projected onto the respective charge coupled devices is, as between the first and second charge coupled devices, taken as $\tau_{12}$ and as between the first and third charge coupled devices taken as $\tau_{13}$, the relative displaced distances $\tau_{12}$ and $\tau_{13}$ are selected to satisfy the following equations $$\tau_{12} = \frac{\tau_H}{2\pi} \cos^{-1}\left(\frac{L_3^2 - L_1^2 - L_2^2}{2L_1 L_2}\right)$$

$$\tau_{13} = \frac{\tau_H}{2} - \frac{\tau_H}{2\pi} \cos^{-1}\left(\frac{L_2^2 + L_1^2 - L_3^2}{2L_1 L_3}\right)$$

where $L_1$, $L_2$ and $L_3$ represent levels of signals which form the luminance signal relating to the respective charge coupled devices.

These and other objects, features and advantages of the invention will become apparent from the following description taken in conjunction with the accompanying drawings.

DESCRIPTION OF THE PREFERRED EMBODIMENT

This invention will be hereinbelow described with reference to the drawings in which 3-phase CCDs are employed, by way of example, as solid state image sensors.

Figure 1:
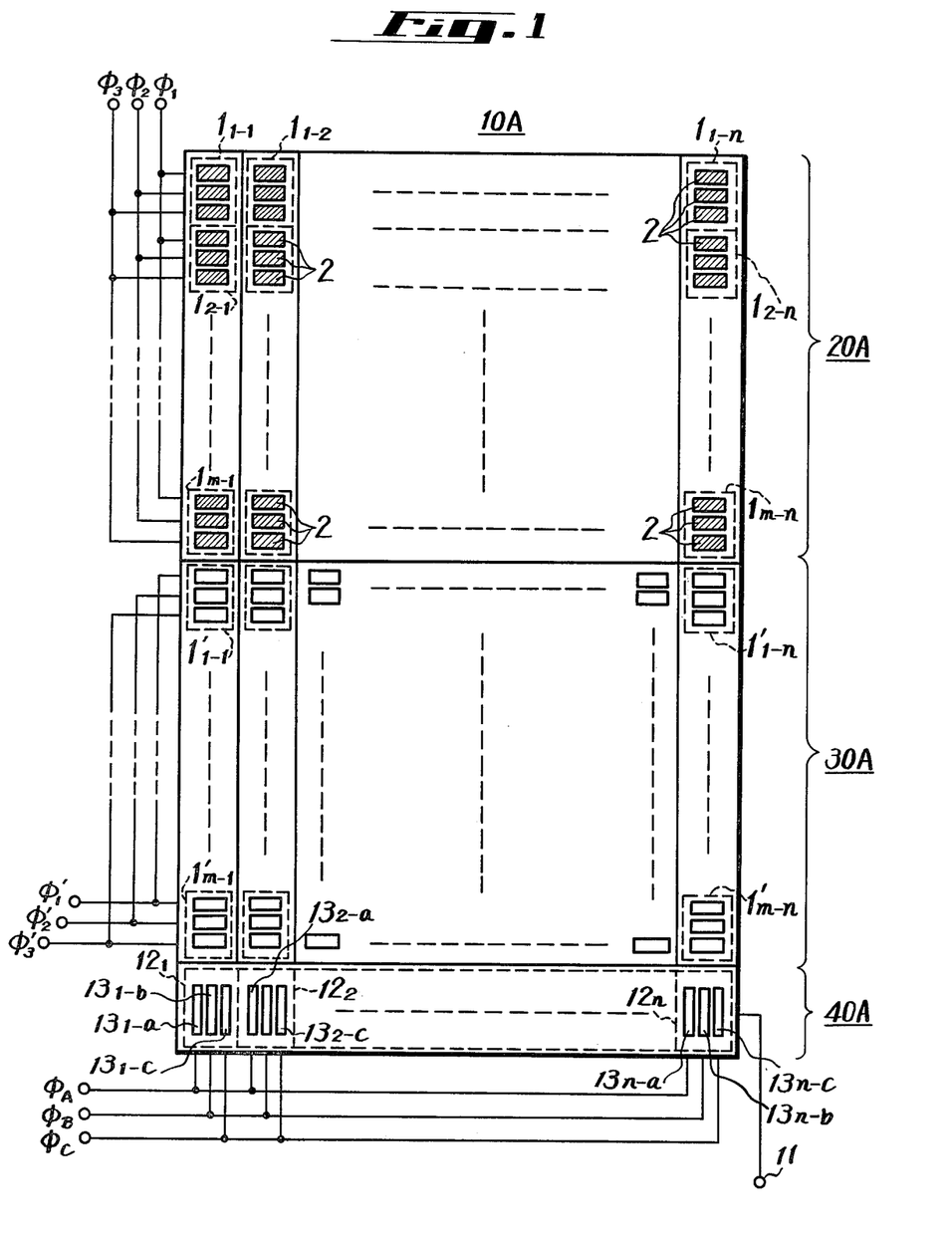
FIG. 1 is a view showing solid state image sensors used in the invention.

In FIG. 1 a CCD 10A consists of a photo-sensitive array 20A on which an image (not shown in FIG. 1) is projected, a temporary storage array 30A which may store electric charges corresponding to input photo information of the image from the photo-sensitive array 20A, and a read-out register 40A for reading out an image signal. The photo-sensitive array 20A includes a predetermined number of picture elements $1_{1-1}, 1_{1-2}, \ldots 1_{m-n}$ which are arranged in the horizontal and vertical directions with a predetermined alignment pitch $\tau_H$ in the horizontal direction, where $n$ and $m$ are positive integers and $\tau_H$ is the reciprocal of the sampling frequency. Each of the picture elements $1_{1-1}, 1_{1-2}, \ldots 1_{m-n}$ has three photo-sensing units 2 which are connected with three electrodes $\phi_1$, $\phi_2$ and $\phi_3$, respectively, to form the photo-sensitive array 20A of the 3-phase CCD.

Figure 2:
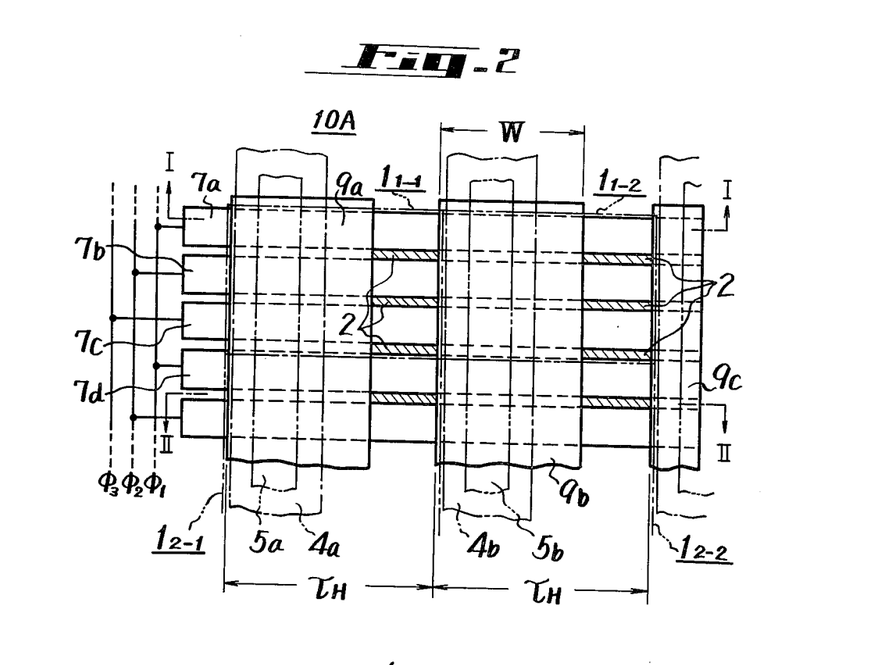
FIG. 2 is an enlarged view showing a part of the solid state image sensors shown in FIG. 1.
Figure 3A:
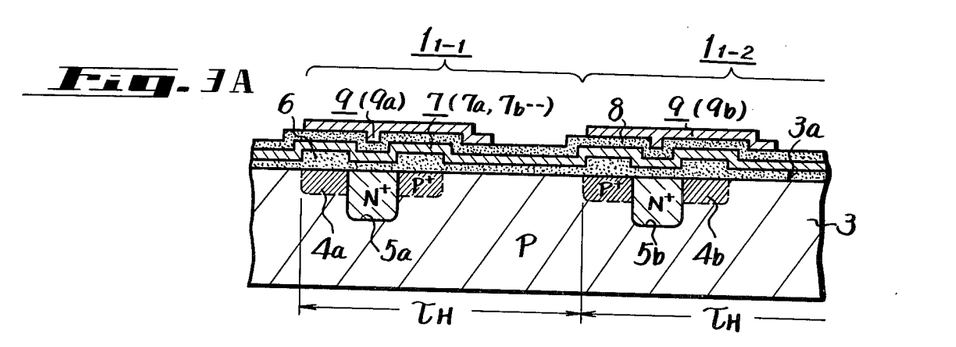
FIG. 3A is a cross-sectional view taken on the line I—I in FIG 2.
Figure 3B:
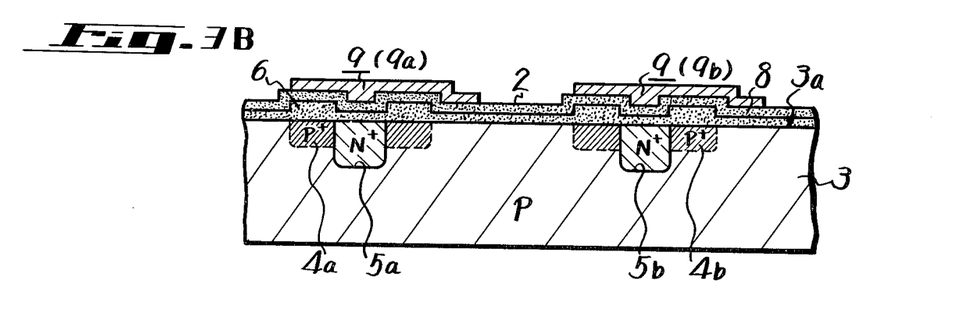
FIG. 3B is a cross-sectional view taken on the line II—II in FIG. 2.

FIGS. 2, 3A and 3B shows a practical example of the photo-sensitive array 20A including the picture elements $1_{1-1}, 1_{1-2}, \ldots 1_{m-n}$.

In FIGS. 3A and 3B a semiconductor substrate 3 is formed of, for example, a P-type conductivity. Regions $4a$, $4b$, . . . are formed of the same conductivity type as that of the semiconductor substrate 3 but are different in impurity concentration, with the alignment pitch $\tau_H$ as channel stops. They are formed by the diffusion method from a top surface $3a$ of the semiconductor substrate 3. In the P-type regions $4a$, $4b$, . . . , there are formed, by the diffusion method, over-flow drain regions $5a$, $5b$, . . . so as to discharge excess electrons which may be produced in the substrate 3 surrounded by the P-type regions $4a$, $4b$, . . . . The conductivity type of the regions $5a$, $5b$ is different from that of the substrate 3, or an N-type in the illustrated example. In FIGS. 3A and 3B, an insulating layer 6 made of $SiO_2$ or the like is formed on the top surface $3a$ and is used in the diffusion method mentioned above.

A conduction layer 7 which is made of, for example, aluminum serves as an electrode on the insulating layer 6, that is, a first conduction layer $7a$, which intersects the channel stop $4a$ at right angles and has a predetermined width on the horizontal plane, is formed on the insulating layer 6 and a second conduction layer $7b$, whose width is the same as that of the first conduction layer $7a$, is also formed on the insulating layer 6 parallel to the first conduction layer $7a$ with a predetermined distance from the latter. Similarly, plural conduction layers $7c$, $7d$, . . . are formed on the insulating layer 6 sequentially and repeatedly with respect to the vertical direction of the photo-sensitive array 20A. In this case the total number of the conduction layers 7 ($7a$, $7b$, $7c$, $7d$, . . . ) is selected to be three times the number of picture elements which may be easily understood from the fact that the CCD 10A is a 3-phase one. Then, the groups of every third conduction layer ($7a$, $7d$, . . . ), ($7b$, $7e$, . . . ), . . . are electrically connected, and the electrodes $\phi_1$, $\phi_2$ and $\phi_3$ are coupled from the connected conduction layer groups, respectively, as shown in FIG. 1.

A metal layer 9, which is made of aluminum, for example, serves as an opaque body, and is formed through an insulating layer 8 made of $SiO_2$ or the like on the conduction layer 7. In this case, the metal layer 9 consists of a plurality of band-shaped strips $9a$, $9b$, . . . each having a predetermined width W, extending in the vertical direction for covering at least each of channel stops $4a$, $4b$, . . . , respectively, but not covering the channel stops belonging to the other channels, as shown in FIG. 2. Therefore, the cross hatched portions in FIG. 2 act as photo-sensing units 2 of the respective picture elements $1_{1-1}, 1_{1-2}, \ldots, 1_{m-n}$. As shown in FIG. 3B, in the photo-sensing unit 2, there is no conduction layer 7 ($7a$, $7b$, . . . ) blocking the top surface $3a$ of the semiconductor substrate 3.

With the photo-sensitive array 20A constructed as above, the input image photo information causes the induction of an electric charge in the semiconductor substrate 3 corresponding to the photo-sensing unit 2 which relates to any of the electrodes $\phi_1$, $\phi_2$ and $\phi_3$ which is supplied with an image-sensing bias having a predetermined potential relation to the input photo information. Thus, if a well-known transfer clock pulse is applied to the electrodes $\phi_1$ to $\phi_3$, the electrical charge induced in each of the picture elements $1_{1-1}, 1_{1-2}, \ldots, 1_{1-n}, 1_{2-1}, \ldots, 1_{2-n}, \ldots, 1_{m-1}, \ldots, 1_{m-n}$ in the horizontal scanning lines can be stored in the temporary storage array 30A during the vertical blanking time in its corresponding horizontal scanning positions. To this end, the temporary storage array 30A is formed substantially the same as the photo-sensitive array 20A in construction, but it is of course necessary that the whole temporary storage array 30A is shielded from light, so that the parts of the temporary storage array 30A corresponding to those of the photo-sensitive array 20A are marked with the same reference numerals with a prime " ' " added.

Figure 4:
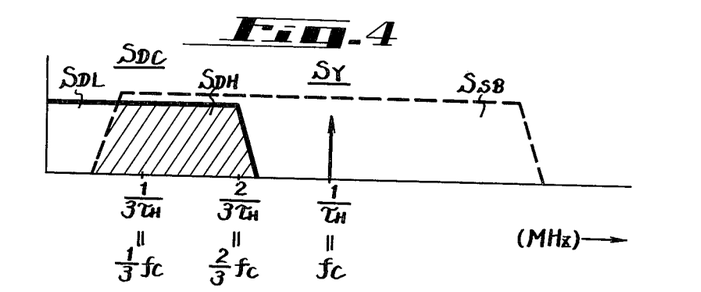
FIG. 4 is a frequency spectrum diagram of the output signal derived from the solid state image sensors shown in FIG. 1.

The charges stored in the temporary storage array 30A are sequentially read out with clock or sampling pulse applied to the read-out register 40A and then derived from a terminal 11 (FIG. 1) as the video signal $S_Y$. As shown in FIG. 1, the read-out register 40A comprises only read-out elements $12_1, 12_2, \ldots, 12_n$ corresponding to the horizontal picture elements. In this case, the read-out is accomplished with sampling pulses $\phi_A$, $\phi_B$ and $\phi_C$ of 3-phases, so that the read-out elements $12_1, 12_2, \ldots, 12_n$ have three read-out units $13_{1-a}$ to $13_{1-c}$; $13_{2-a}$ to $13_{2-c}$; . . . , $13_{n-a}$ to $13_{n-c}$, respectively. From the CCD 10A formed as above, a video signal $S_Y$ is obtained which has signal components shown in FIG. 4. In FIG. 4, reference letter $S_{DC}$ indicates a DC component and $S_{SB}$ a side band component, respectively.

At least two CCDs 10A constructed as above are used. Needless to say, other types of solid state image sensors, such as a photo diode array instead of CCDs could be used.

FIG. 4 shows that if the sampling frequency is taken as $f_c$, the resultant video signal $S_Y$, which may be obtained by scanning every picture element at every horizontal period, includes the DC component $S_{DC}$ and the side band component $S_{SB}$ (AC component) in which the sampling frequency $f_c$ is modulated with the DC component $S_{DC}$. However, FIG. 4 shows only the fundamental wave thereof.

In this case, the AC or side band component $S_{SB}$ has upper and lower side band components with the sampling frequency $f_c$ at its center, so that if the frequency band of the DC component $S_{DC}$ is selected sufficiently wide so as to avoid deterioration of resolution, the side band component $S_{SB}$ by the sampling frequency $f_c$ is superimposed with a higher band component $S_{DH}$ of the DC component $S_{DC}$ as shown in FIG. 4 and the part with hatches in FIG. 4 becomes a sampling error. If a picture is reproduced from a video signal with the sampling error, a flicker is caused in the reproduced picture as mentioned previously.

With the solid state camera of the invention, the relative positional relationship among light images projected on the solid state image sensors is selected to satisfy conditions which will be described later. However, since the positional relationship is a relative one, it is possible that either the positional relationship among the light images themselves or the positional relation among the CCDs themselves be considered. In the following description, the latter case will be explained, by way of example only.

Figure 5:
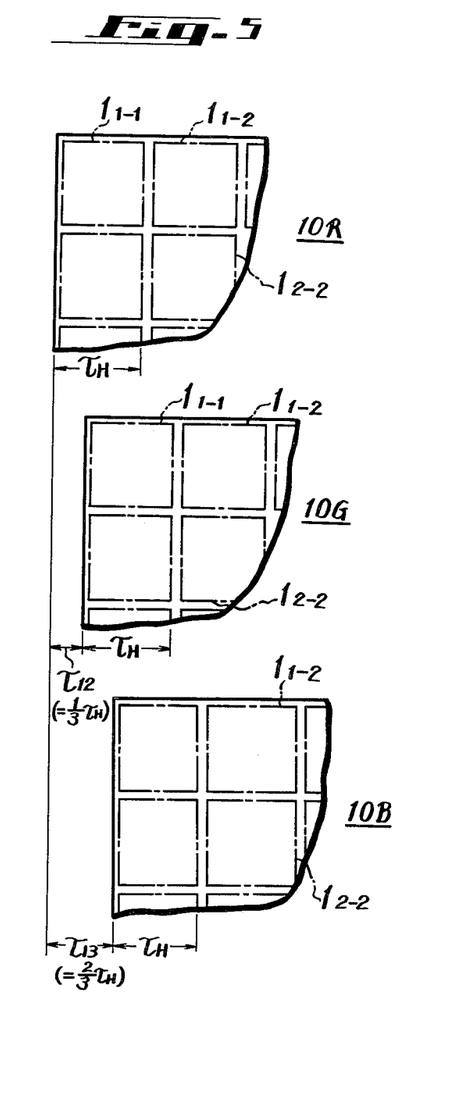
FIG. 5 is a part of the solid state image sensor used for explaining the positional relationship among light images projected thereon.

In one example of the invention, three CCDs 10R, 10G and 10B, each of which is same as the CCD 10A shown in FIG. 1, are employed as shown in FIG. 5. In this case, if the first CCD 10R is taken as a reference, the second CCD 10G is displaced from the first CCD 10R by $\tau_{12}$ in the horizontal scanning direction, and the third CCD 10B is displaced from the first CCD 10R by $\tau_{13}$ also in the horizontal scanning direction, respectively. The displaced distances $\tau_{12}$ and $\tau_{13}$ are selected to satisfy the following equations (1) and (2).

$$\tau_{12} = \frac{\tau_H}{2\pi} \cos^{-1}\left(\frac{L_3^2 - L_1^2 - L_2^2}{2L_1L_2}\right) \tag{1}$$

$$\tau_{12} = \frac{\tau_H}{2} - \frac{\tau_H}{2\pi} \cos^{-1}\left(\frac{L_3^2 + L_1^2 - L_2^2}{2L_1L_3}\right) \tag{2}$$

(where $\tau_H$ represents the alignment pitch of the picture element in the horizontal scanning direction, and $L_1$, $L_2$, $L_3$ represent the levels of output video signals from the respective CCDs 10R or 10B which signals form the luminance signal. Accordingly, as will be described later, it can be considered that the levels $L_1$ to $L_3$ are the light energies themselves projected onto the respective CCDs 10R to 10B or levels just before forming the luminance signal. In this example, the latter case will be described.)

That is, the signal level to be treated is previously determined, and if under such a condition the respective displaced distances $\tau_{12}$ and $\tau_{13}$ are selected to satisfy the above equations (1) and (2) respectively, the sampling error can be avoided by treating the signal suitably.

The reason for this will be now described based upon the equations (1) and (2).

Figure 6:
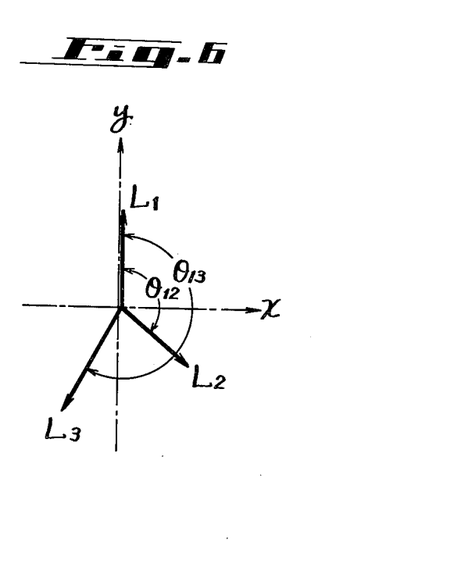
FIGS. 6, 7 and 12 are vector diagrams used for explaining the phase relationship among output video signals.

If it is assumed that the first to third CCDs 10R to 10B are arranged at the positional relationship as shown in FIG. 5, the phase relationship among the fundamental waves of carriers of video signals $S_R$, $S_G$ and $S_B$ derived from the respective CCDs 10R to 10B is shown in FIG. 6. In FIG. 6, $\theta_{12}$ is the phase difference corresponding to the distance $\tau_{12}$ with the video signal $S_R$ derived from the CCD 10R as a reference. Similarly, $\theta_{13}$ corresponds to the distance $\tau_{13}$. Accordingly, the phase differences $\theta_{12}$ and $\theta_{13}$ can be expressed as follows.

$$\theta_{12} = 2\pi \frac{\tau_{12}}{\tau_H} \tag{3}$$

$$\theta_{13} = 2\pi \frac{\tau_{13}}{\tau_H} \tag{4}$$

The fact that the sampling error is produced means that the side band component $S_{SB}$ exists with the sampling frequency $f_c$ at its center, as shown in FIG. 4. Accordingly, if the side band component $S_{SB}$ disappears, the sampling error disappears also.

Since FIG. 6 shows the phase relationship and level relation among the fundamental waves of carriers of the video signals $S_R$ to $S_B$, the fundamental wave components mentioned above and the DC component are equal. Thus, if the sum of the respective signal levels or the sum of the levels $L_1$ to $L_3$ of the video signals derived from the CCDs 10R to 10B shown in FIG. 6 become zero, no sampling error is caused due to the reason mentioned above. The condition for making the sum of the levels $L_1$ to $L_3$ shown in FIG. 6 zero is that when the levels are divided into x- and y-axis components, the sums of the respective axis components become zero, respectively. Therefore, the following equations (5) and (6) are established, respectively. As y-axis component $$L_1 + L_2 \cos \theta_{12} + L_3 \cos \theta_{13} = 0 \tag{5}$$

As x-axis $$L_2 \sin \theta_{12} + L_3 \sin \theta_{13} = 0 \tag{6}$$

In the equation (6), since $L_2 \geq 0$ and $L_3 \geq 0$, the factors $\sin \theta_{12}$ and $\sin \theta_{13}$ are different in sign. If $\sin \theta_{12} \geq 0$ is assumed, $\sin \theta_{13} \leq 0$ is established. Therefore, the phase angles $\theta_{12}$ and $\theta_{13}$ are expressed as follows.

$$0 \leq \theta_{12} \leq \pi$$
$$\pi \leq \theta_{13} \leq 2\pi \tag{7}$$

If the phase angle $\theta_{13}$ is expressed as follows, $$\theta_{13} = \theta_{13'} + \pi \tag{8}$$

the following condition (9) is obtained from the equation (7).

$$0 \leq \theta_{13'} \leq \pi \tag{9}$$

Accordingly, if the equation (8) is substituted into the equations (5) and (6) and they are rewritten, respectively, the equations (5) and (6) can be expressed as the following equations (10) and (11), respectively.

$$L_2^2 \cos^2 \theta_{12} = L_3^2 \cos^2 \theta_{13'} - 2L_1L_3 \cos \theta_{13'} + L_1^2 \tag{10}$$

$$L_2^2 \sin^2 \theta_{12} = L_3^2 \sin^2 \theta_{13'} \tag{11}$$

From the equations (1) and (11), the following equations (12) and (13) can be derived, respectively.

$$\cos \theta_{13'} = \frac{L_3^2 + L_1^2 - L_2^2}{2L_1L_3} \tag{12}$$

$$\cos \theta_{12} = \frac{L_3^2 - L_1^2 - L_2^2}{2L_1L_2} \tag{13}$$

If the equations (13) and (12) are substituted into the equations (3) and (4) under the equations (7) to (9) and then they are arranged, the following equations (14) and (15) are derived, respectively.

$$\tau_{12} = \frac{\tau_H}{2\pi} \theta_{12} = \frac{\tau_H}{2\pi} \cos^{-1}\left(\frac{L_3^2 - L_1^2 - L_2^2}{2L_1L_2}\right) \tag{14}$$

$$\tau_{13} = \frac{\tau_H}{2} + \frac{\tau_H}{2\pi} \theta_{13'} =$$

$$\frac{\tau_H}{2} + \frac{\tau_H}{2\pi} \cos^{-1}\left(\frac{L_3^2 + L_1^2 - L_2^2}{2L_1L_3}\right) \tag{15}$$

However, the following condition (16) is satisfied.

$$\frac{L_3^2 - L_1^2 - L_2^2}{2L_1L_2} \leq 1 \tag{16}$$

$$\frac{L_3^2 + L_1^2 - L_2^2}{2L_1L_3} \leq 1$$

If the displaced distances $\tau_{12}$ and $\tau_{13}$ among the CCDs 10R to 10B are selected to satisfy the equations (14) and (15), respectively, the output levels $L_1$ to $L_3$ are balanced upon reproducing the black and white picture, and hence the side band component $S_{SB}$ can be made zero. Thus, the sampling error caused by the side band component $S_{SB}$ can be eliminated completely, and also the band of the luminance signal can be made sufficiently wide by a small number of picture elements.

In the case where the displaced distances $\tau_{12}$ and $\tau_{13}$ exceed the length of one picture element in the horizontal direction, the equations (14) and (15) can be fundamentally established without change. For example, when the second CCD 10G is displaced from the first CCD 10R by the length of one picture element in the horizontal direction (= one alignment pitch), the first picture elements $1_{1-1}, \ldots, 1_{m-1}$ of the second CCD 10G do not exist, and the second picture elements $1_{1-2}, \ldots, 1_{m-2}$ become the first effective picture elements in the horizontal scanning direction. Therefore, in such a case the width of the effective picture screen of the second CCD 10G in the horizontal direction becomes narrow only but the other conditions are not changed.

The practical examples of the equations (14) and (15) will be now described.

First, the case where a black and white video signal is obtained will be described. When the black and white video signal is produced, it can be considered that the levels of light images of an object projected on three CCDs 10R to 10B are equal with one another. For this reason, the levels of video signals derived from the respective CCDs 10R to 10B are equal, so that it can be considered that the levels of the video signals which will form the luminance signal are equal. That is, the condition $L_1 = L_2 = L_3$ is established. Thus, if this condition is substituted into the equations (12) and (13), respectively, the following equation (17) can be obtained.

$$\cos \theta_{13} = \frac{1}{2} \therefore \theta_{13} = \frac{1}{3}\pi$$
$$\cos \theta_{12} = -\frac{1}{2} \therefore \theta_{12} = \frac{2}{3}\pi$$
(17)

where " − " means the counter-clockwise direction.

If the equation (17) is substituted into the equations (14) and (15), respectively, the following equations (18) can be obtained.

$$\tau_{12} = \frac{1}{3}\tau_H$$
$$\tau_{13} = \frac{2}{3}\tau_H$$
(18)

The condition represented by the equation (18) is the relative positional relationship among the CCDs 10R to 10B under the condition $L_1 = L_2 = L_3$. FIG. 5 shows the CCDs 10R to 10B arranged at the relative positional relationship presented by the equation (18). Accordingly, if the displaced distances $\tau_{12}$ and $\tau_{13}$ are selected to satisfy the equation (18), the levels $L_1$ to $L_3$ of the video signals from the CCDs 10R to 10B have the phase difference of 120° between the adjacent ones. Thus, the x-and y-axis components of the levels $L_1$ to $L_3$ become zero in sum, respectively, and hence the sampling error can be eliminated completely.

An example of the solid state camera of the invention which produce a video signal without sampling error mentioned above, will be explained with reference to FIG. 8.

Figure 8:
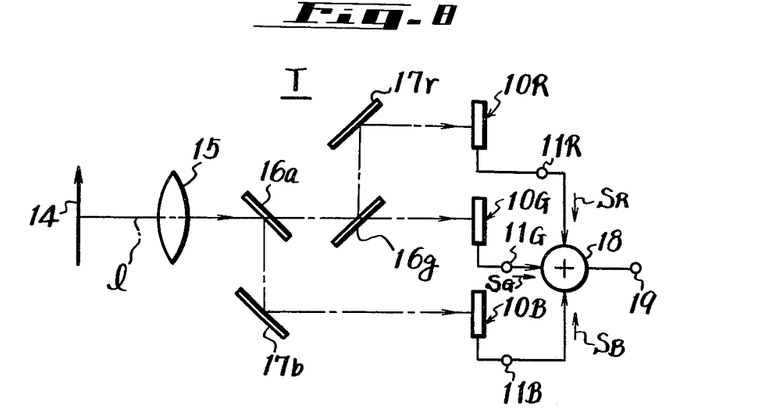
FIG. 8 is a systematic diagram showing an example of the solid state camera according to the invention.

In FIG. 8, reference letter T designates the solid state camera of the invention generally. The photo or light image 14 is projected along an optical path 1 through an optical lens system 15, half mirrors 16a, 16g and mirrors 17r, 17b on the CCDs 10R, 10G and 10B, respectively. In this case, the CCDs 10R to 10B are displaced with respect to one another by $\frac{1}{3}\tau_H$ so as to make the light image of the object 14 projected on the CCDs 10R to 10B at the displaced distance of $\frac{1}{3}\tau_H$ from one another.

The light images of the object 14 projected onto the CCDs 10R to 10B displaced at the distance of $\frac{1}{3}\tau_H$ are converted to the corresponding electric charges and then derived from respective output terminals 11R, 11G and 11B as the electric signals corresponding to the intensity of the light images by means of the sampling pulses $\phi_A$, $\phi_B$ and $\phi_C$, respectively. Thereafter, these electric signals are supplied to an adding circuit 18 to be composed. Upon reading out the electric signals from the respective CCDs 10R to 10B, they are shifted by 120° in phase with one another and then derived as the video signals $S_R$, $S_G$ and $S_B$ sequentially and alternately. If the respective video signals $S_R$ to $S_B$ are not read out with a phase difference corresponding to the displaced distance of $\frac{1}{3}\tau_H$ they are read out in the same phase. The reason for this was described in a copending U.S. application Ser. No. 561,945 filed Mar. 25, 1975 whose assignee is same as that of this application.

Figure 9:
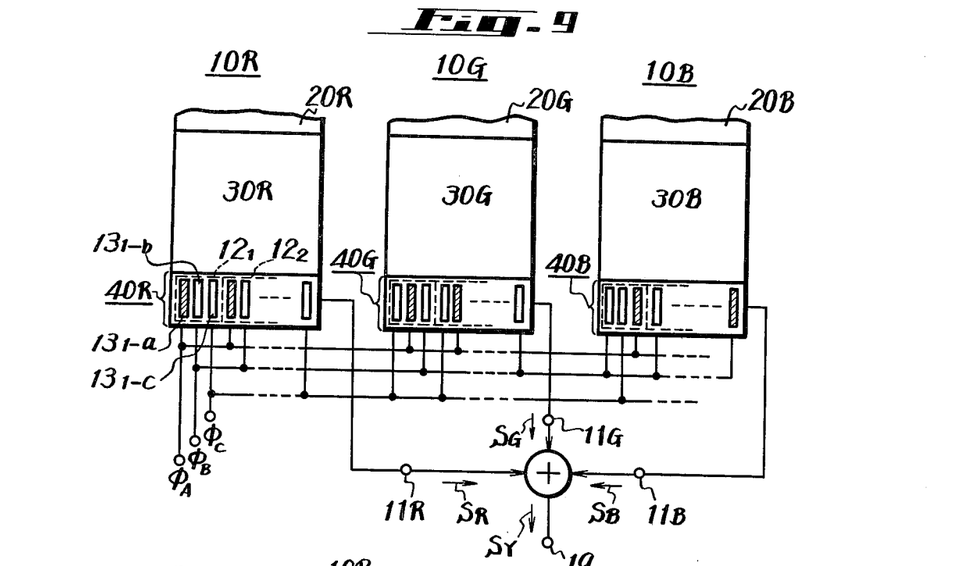
FIG. 9 is a schematic diagram showing the manner of composing the video signals used in the example shown in FIG. 8.

An example, where the video signals $S_R$ to $S_B$ are read out sequentially and alternately with the same sampling pulses $\phi_A$ to $\phi_C$, will be described with reference to FIG. 9. As shown in FIG. 9, the sampling pulses $\phi_A$ to $\phi_C$ are supplied to the read-out registers 40R to 40B of the CCDs 10R to 10B, respectively. The read-out elements $12_1, 12_2, \ldots, 12_n$ of the respective read-out registers 40R to 40B correspond to the picture elements of the CCDs 10R to 10B in the horizontal scanning direction in number. In this case, each of the read-out elements $12_1, \ldots, 12_n$ is divided into three read-out units $13_{1-a}, 13_{1-b}, 13_{1-c}, \ldots$ as described above. To give the phase difference of 120° among the read-out registers 40R to 40B with the same sampling pulses $\phi_A$ to $\phi_C$ themselves supplied to the corresponding read-out units $13_{1-a}, 13_{1-b}, \ldots$ of the respective read-out registers 40R to 40B, it is enough that the sampling pulses $\phi_A$ to $\phi_C$ are supplied with the units being displaced one by one, as shown in FIG. 9.

With such a construction, when the electric charges corresponding to one horizontal period are transferred from the temporary storage arrays 30R to 30B to the corresponding read-out registers 40R to 40B, the charges are stored in the read-out units with cross hatched lines in FIG. 9 by the sampling pulse $\phi_a$ without failure. Therefore, if the charges are read out under such a condition, the phase relationship upon reading out becomes 120°, and the signals can be read out sequentially and alternately at the phase difference of 120°. As a result, the composed video signals $S_R$ to $S_B$ have phase differences of 120°.

Figure 7:
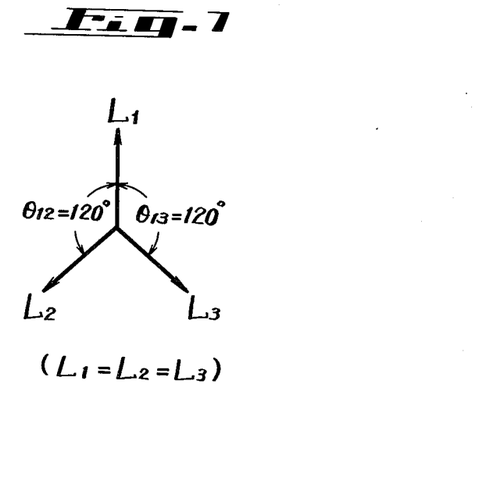

If the phase relation shown in FIG. 7 is kept in the video signals $S_R$ to $S_B$, their output levels $L_1$ to $l_3$ are equal. Therefore, if the video signals $S_R$ to $S_G$ are added, the side band components $S_{SB}$ are cancelled and hence the sampling error can be eliminated effectively. For this reason, the flicker on the screen of a television receiver is eliminated, and the resolution in the horizontal direction can be enhanced without increasing the number of picture elements in the horizontal scanning direction.

In the prior art, if the desired resolution is realized, it is necessary to increase the number of picture elements in the horizontal scanning direction and hence there is a problem in manufacturing the CCD, as described previously. For example, if the band of the DC component $S_{DC}$ is selected to be about 3.5 MHz, the sampling frequency $f_c$ must be selected at about 7.0 Mhz to produce a video signal without sampling error. As a result, more than 400 picture elements in the horizontal scanning direction are required in the prior art.

On the contrary, with the present invention the sampling error can be eliminated completely, so that the sampling frequency $f_c$ can be lowered to about 4.0 MHz and hence about 250 of picture elements are sufficient in the horizontal scanning direction. Accordingly, the CCD itself can be manufactured more easily as compared to the prior art. Further, even though about 250 horizontal picture elements are used, three CCDs are employed and the light or photo information to one picture element is derived from the three CCDs 10R to 10B, so that the horizontal resolution can be improved without increasing the number of horizontal picture elements. Thus, if resolution similar in degree to the prior art is desired, the horizontal picture elements can be reduced further in number as compared with the prior art. Therefore, the CCD can be made compact and easily manufactured.

The displaced distances $\tau_{12}$ to $\tau_{13}$ described above are for the case where a black and white video signal is obtained. The case where a color video signal is obtained will be described in which a luminance signal approximately similar to that of the NTSC system is desired.

Figure 10:
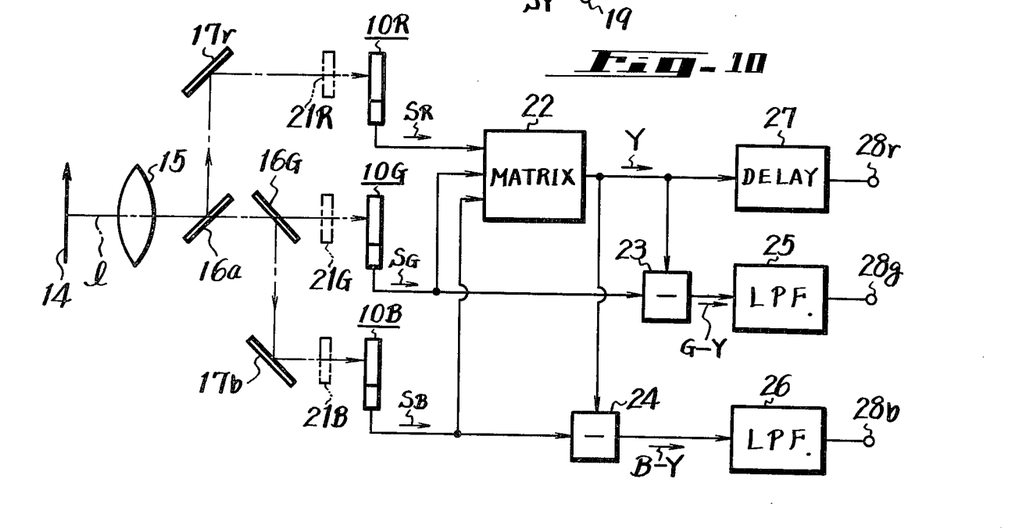
FIG. 10 is a systematic diagram showing another example of the invention.

An example of the solid state color camera of the present invention, which achieves the object just mentioned above, will be described with reference of FIG. 10 in which the parts corresponding to those of FIG. 8 are marked with corresponding numerals and their description omitted. In the example of FIG. 10, since three CCDs 10R, 10G and 10B are employed and a color video signal is obtained, mono-color filters 21R, 21G and 21B, different in color, are disposed in front of the CCDs 10R, 10G and 10B, respectively. In this case, it is assumed that the R (red) filter 21R is disposed in front of the CCD 10R, the G (green) filter 21G in front of the CCD 10G, and the B (blue) filter 21B in front of the CCD 10B, respectively.

In this case, the levels $L_1$ to $L_3$ of the video signals are zero or larger than zero, respectively, and also the conditions of $-1 \leq \cos\theta_{12} \leq 1$ and $-1 \leq \cos\theta_{13} \leq 1$ are satisfied, so that the condition of $L_1 \leq L_2 \leq L_3$ is satisfied, the following condition (19) is established.

$$L_2 \leq L_1 + L_3$$

$$L_3 \leq L_1 + L_2$$

$$L_1 \leq L_1 + L \tag{19}$$

Accordingly, if the luminance component $E_Y$ in the NTSC system is considered, since $E_Y = 1$, the levels $L_1$ to $L_3$ of the video signals cannot be greater than 0.5 when the sum $(L_1 + L_2 + L_3)$ of the levels $L_1$ to $L_3$ is taken as 1. That is, the condition $L_3 \leq L_2 \leq L_1 \leq 0.5$ is established.

The luminance component $E_Y$ of the NTSC system is $$E_Y = 0.30R + 0.59G + 0.11B$$

Since the condition $L_3 \leq L_2 \leq L_1 \leq 0.5$ exists, the ratio of the components in the NTSC system cannot be employed in this example. However, the approximate value thereof can be employed, for example, a luminance component $E_Y$, selected as in the following equation (20) can be used.

$$E_Y = 0.33R = 0.50G + 0.17B \tag{20}$$

In equation (20), the respective factors R, G and B represent the levels of the color components of the video signals derived from the CCDs, 10R to 10B, respectively, so that the ratios among the levels of the video signals are set to satisfy the following equation (21).

$$L_1 = 0.33$$

$$L_2 = 0.50$$

$$L_3 = 0.17 \tag{21}$$

If the levels $L_1$ to $L_3$ are set as above, the equations $\cos\theta_{12} = -1$ and $\cos\theta_{13} = 1$ must be required as the condition to make the resulting vector of the components of the levels $L_1$ to $L_3$ equal to zero and to eliminate the sampling error. Thus, the following equation (22) is obtained.

$$\tau_{12} = \tau_{13} = \tfrac{1}{2}\tau_H \tag{22}$$

Figure 11:
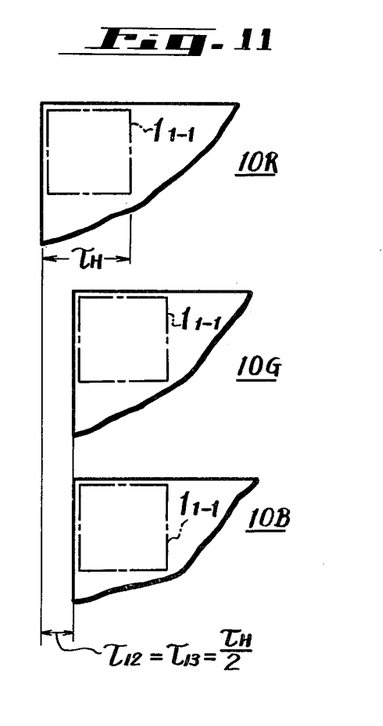
FIG. 11 is a part of the solid state image sensor used in the example shown in FIG. 10.

That is, when the levels $L_1$ to $L_3$ are set to satisfy the equation (21), the CCDs 10R to 10B are disposed at the distances $\tau_{12}$ $\tau_{13}$ expressed by the equation (22) (refer to FIG. 11).

Figure 12:
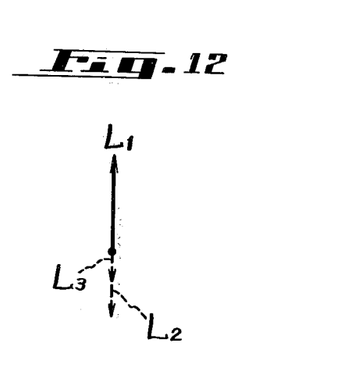

If the CCDs 10R to 10B are disposed at the distances which will satisfy the equation (22), and the sampling pulses $\phi_A$ to $\phi_C$ are supplied thereto as described in connection with FIG. 9, that is, the video signals $S_G$ and $S_B$ are read out from the CCDs 10G and 10B at the time corresponding to $\tfrac{1}{2}\tau_H$ after the video signal $S_R$ is read out from the CCD 10R, the phase relation among the video signals $S_R$ to $S_B$ becomes as shown in FIG. 12. Thus, when the video signals $S_R$ to $S_B$ are composed, their side band components $S_{SB}$ are cancelled with one another and hence no sampling error appears.

Further, if the video signals $S_R$ to $S_B$ derived from the CCDs 10R to 10B are supplied to a matrix circuit 22 as shown in FIG. 10, a luminance signal Y similar to that of the NTSC system is obtained from the matrix circuit 22.

The example of FIG. 10 is the color camera, so that a matrix circuit 23 is provided which is supplied with the luminance signal Y from the matrix circuit 22 and with the video signal $S_G$ from the CCD 10G to produce a color difference signal (G-Y), and a matrix circuit 24 is provided which is supplied with the luminance signal Y from the matrix circuit 22 and with the video signal $S_B$ from the CCD 10B to produce a color difference signal (B-Y), respectively. The color difference signal (G-Y) is delivered through a low pass filter 25 to an output terminal 28g, the color difference signal (B-Y) is delivered through a low pass filter 26 to an output terminal 28b, and the luminance signal Y is delivered to an output terminal 28r through a delay circuit 27 which compensates for the delay caused by the low pass filters 25 and 26.

As described above, when the CCDs 10R to 10B are disposed at the displace distance coincident with the equation (22), generation of the sampling error can be avoided and also the luminance signal can be approximated to that of the NTSC system.

It will be apparent that many modifications and variations of the preferred embodiments could be effected by one skilled in the art without departing from the spirit or scope of the novel concepts of the invention.

I CLAIM AS MY INVENTION:

1. A solid state camera comprising:

a plurality of image sensors, each having a plurality of picture-sensing units spaced apart by an alignment pitch of $\tau_H$, means for displaying an image simultaneously on each of said image sensors, means for displacing the image on each sensor by $\tau_{12}$ and $\tau_{13}$ in a given direction with respect to at least one of said sensors where $$\tau^{12} = \frac{\tau H}{2\tau} \cos^{-1}\left(\frac{L_3^2 - L_1^2 - L_2^2}{2L_1L_2}\right)$$

$$\tau_{13} = \frac{\tau H}{2} + \frac{\tau H}{2\tau} \cos^{-1}\left(\frac{L_3^2 + L_1^2 - L_2^2}{2L_1L_3}\right)$$

where $\tau_{12}$ is a displaced distance between the images projected on said first sensor and on said second sensor in said given direction, $\tau_{13}$ is a displaced distance between the images projected on said first sensor and on said third sensor in said given direction, and $L_1$, $L_2$ and $L_3$ are output signals levels from said first, second and third sensors, means coupled to said picture sensing units for reading said respective images sequentially in said given direction, means associated with said reading means for shifting the readout time thereof by a phase of the read-out frequency which corresponds to said displaced distances $\tau_{12}$ and $\tau_{13}$, means coupled to said reading means for mixing the respective output signals thereof, and means for deriving an output from said mixing means.

2. A solid state camera in accordance with claim 1 wherein the image sensors comprise charge coupled devices having transfer electrodes and semiconductor substrates.

3. A solid state camera in accordance with claim 1 wherein said means for displaying an image simultaneously on each of said image sensors includes a different color filter for casting the image on each of the respective sensors.

4. A solid state camera in accordance with claim 3 wherein said means for mixing the respective output signals of the reading means includes means for developing a luminance signal and wherein said means for deriving an output from the mixing means comprises means for developing chrominance signals.

5. A solid state camera in accordance with claim 1 wherein $\tau_{12}$ equals $\tau_{13}$.

* * * * *